US006760585B1

(12) United States Patent
Stumer et al.

(10) Patent No.: US 6,760,585 B1
(45) Date of Patent: Jul. 6, 2004

(54) PRIVATE USER MOBILITY (PUM) UPDATE AND PRIVATE INTEGRATED SERVICES NETWORK PUM ALTERNATIVE IDENTIFIER TRANSLATOR (PP-AIT) SYSTEM AND METHODS

(75) Inventors: Peggy M. Stumer, Boca Raton, FL (US); Dennis L. Kucmerowski, Delray Beach, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/580,275

(22) Filed: May 25, 2000

Related U.S. Application Data

(60) Provisional application No. 60/136,375, filed on May 26, 1999, and provisional application No. 60/110,666, filed on Dec. 2, 1998.

(51) Int. Cl.[7] ............................ H04Q 7/20; H04M 1/00; G06F 15/16

(52) U.S. Cl. ..................... 455/435.1; 455/555; 455/560; 370/338; 370/252; 209/245; 209/229

(58) Field of Search ............................... 455/435, 432.1, 455/555, 461, 433, 552, 558, 432.3, 424, 426.2, 560; 370/338, 252, 401; 709/245, 229, 227; 340/5.1, 5.2, 5.21, 5.22, 5.25, 5.24, 5.61, 5.64, 5.65, 5.8, 5.81, 5.85

(56) References Cited

U.S. PATENT DOCUMENTS 5,020,091 A * 5/1991 Krolopp et al. ............. 455/432
5,375,161 A * 12/1994 Fuller et al. ................ 455/417
5,537,457 A * 7/1996 Lantto et al. ............... 455/433

(List continued on next page.)

OTHER PUBLICATIONS

Standard ECMA–281, ECMA Standardizing Information and Communication Systems, Private Integrated Services Network (PISN)—Specification, Functional Model and Information Flows—Private User Mobility (PUM)—Registration Supplementary Service, Dec. 1998.

Standard ECMA–282, ECMA Standardizing Information and Communication Systems, Private Integrated Services Network (PISN) –Inter–Exchange Signalling Protocol–Private User Mobility (PUM)—Registration Supplementary Service; Dec. 1998.

Standard ECMA–283, ECMA Standardizing Information and Communication Systems, Private Integrated Services Network (PISN)—Specification, Functional Model and Information Flows—Private User Mobility (PUM)—Call Handling Additional Network Features, Dec. 1998.

(List continued on next page.)

*Primary Examiner*—Sinh Tran
*Assistant Examiner*—K. Afshar

(57) ABSTRACT

In a network comprising call handling services for mobile users, services being requested by the mobile user for an active call and wherein each user registers for services with a personal identification number (PIN), a method for updating said personal identification number during an active call, the steps of said method comprising: registering user initially with the network for services with user's personal identification number during an active call; signalling a user preference to update the personal identification number; and updating user's personal identification number during said active call. In another aspect, a network comprising a plurality of servers connecting with mobile users requesting call services, wherein said users register with one of said servers with a private user mobility wherein further each said user has an associated home server and may request services at said home server or other visitor servers; a method for user registration, the steps of said method comprising: entering an alternative identifier instead of said private user mobility number at a server; mapping said alternative identifier to a number representing said user's home server; returning either a rejected or accepted result with said home server.

17 Claims, 11 Drawing Sheets

PUM-Update Block Diagram

U.S. PATENT DOCUMENTS

| | | | | | |
|---|---|---|---|---|---|
| 5,724,423 | A | * | 3/1998 | Khello | 713/184 |
| 5,742,905 | A | * | 4/1998 | Pepe et al. | 455/461 |
| 5,812,948 | A | * | 9/1998 | Hjern et al. | 455/435.1 |
| 6,021,176 | A | * | 2/2000 | McKendry et al. | 379/35 |
| 6,091,807 | A | * | 7/2000 | Yoshida | 358/400 |
| 6,192,165 | B1 | * | 2/2001 | Irons | 382/306 |
| 6,199,161 | B1 | * | 3/2001 | Ahvenainen | 713/155 |
| 6,223,985 | B1 | * | 5/2001 | DeLude | 235/379 |
| 6,317,594 | B1 | * | 11/2001 | Gossman et al. | 455/414 |
| 6,374,102 | B1 | * | 4/2002 | Brachman et al. | 455/422 |
| 6,417,934 | B1 | * | 7/2002 | Sadr-Salek | 358/442 |

OTHER PUBLICATIONS

Standard ECMA–284, ECMA Standardizing Information and Communication Systems, Private Integrated Services Network (PISN)—Inter–Exchange Signalling Protocol—Private User Mobility (PUM)—Registration Supplementary Service, Dec. 1998.

* cited by examiner

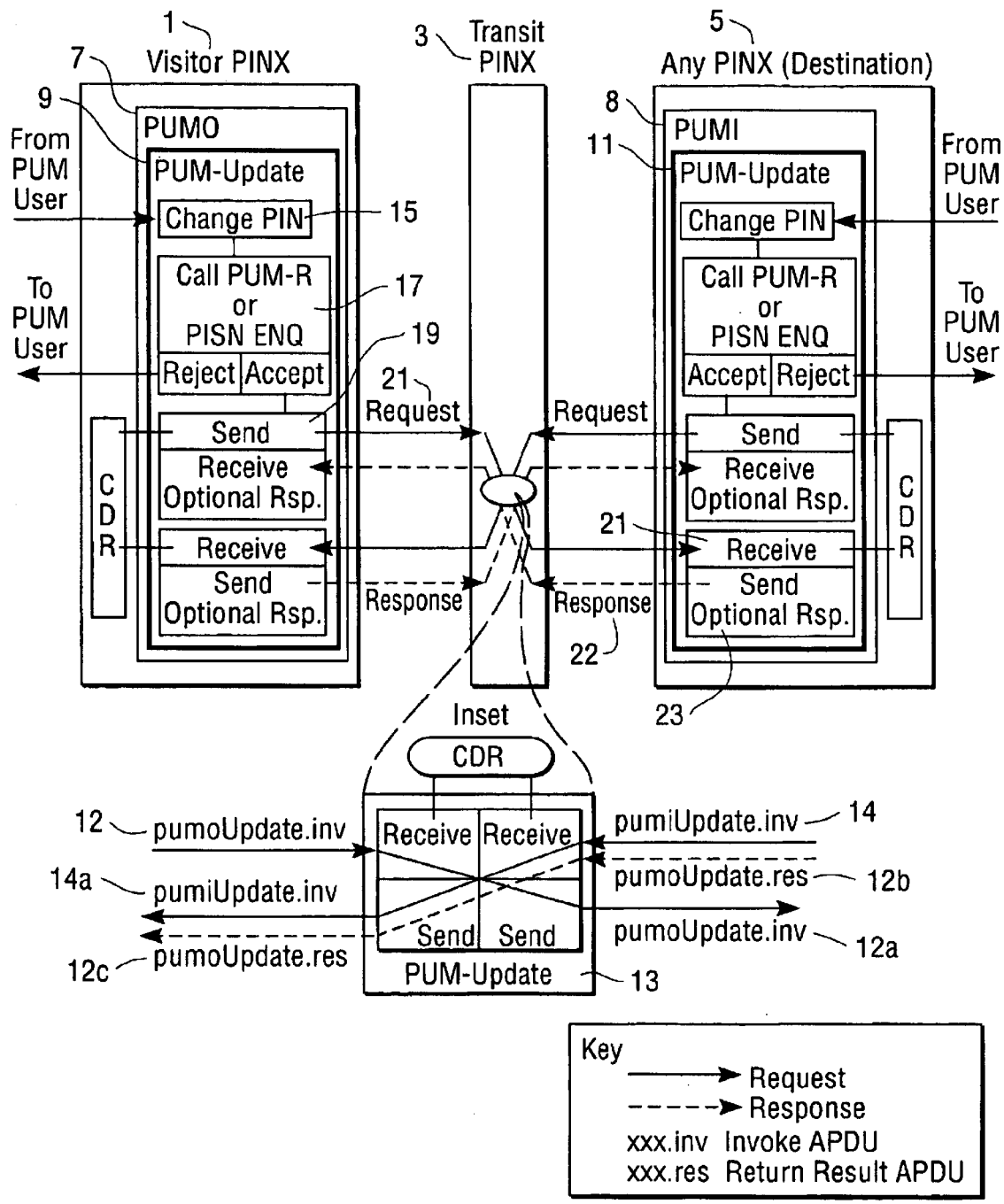
FIG. 1 PUM-Update Block Diagram

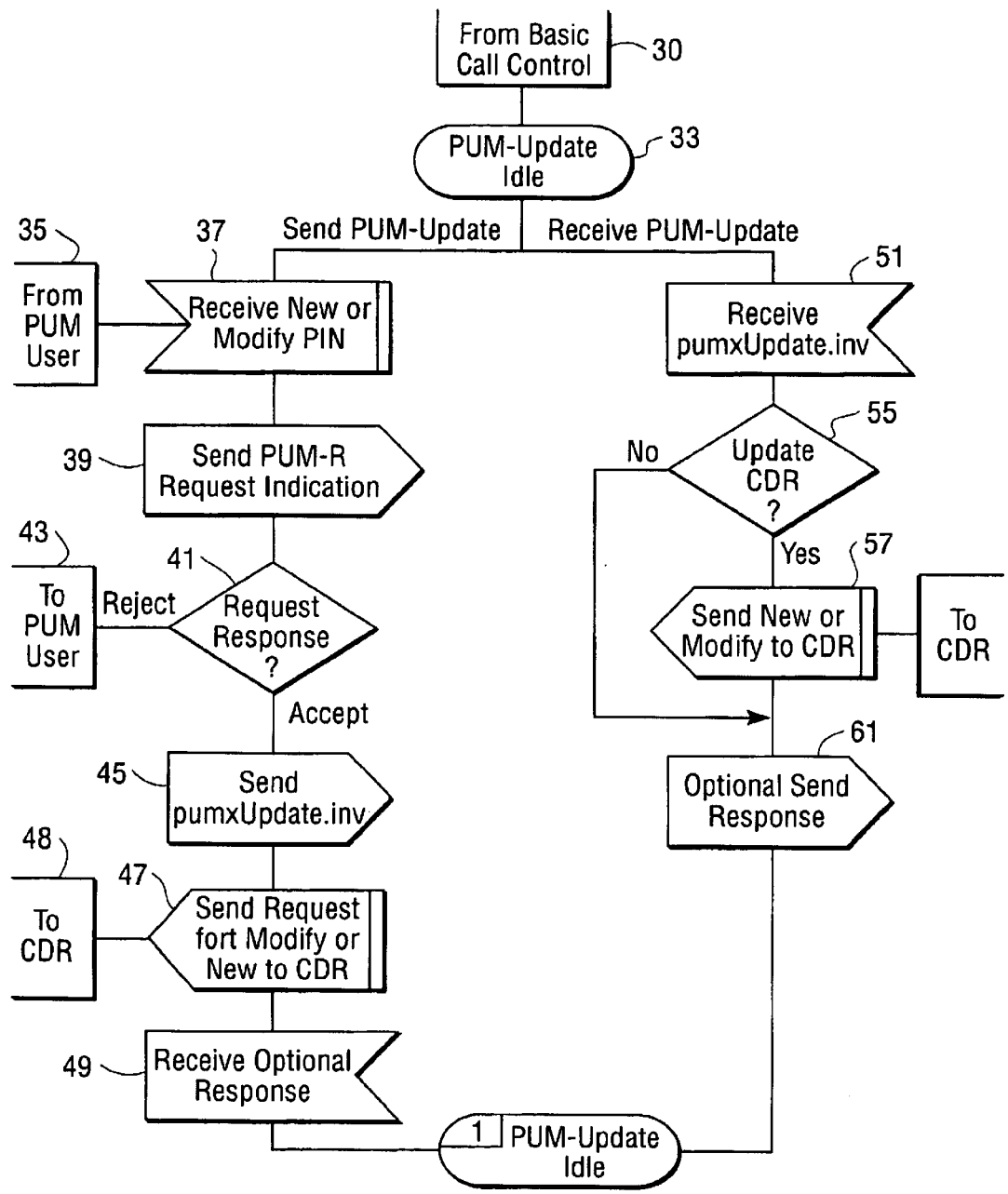
FIG. 2 SDL for PUM-Update

Table 1: Contents of PUM-Update

| Service Elements | Allowed Value | Request |
|---|---|---|
| 65 — PUM User's Identity | Note 1 | Mandatory |
| 67 — Hosting Address | | Mandatory |
| 69 — Service Option | – New PIN/CDR<br>– Modify PIN/CDR | Mandatory |
| 71 — PUM User's Updated PIN | | Mandatory |
| 73 — Return Result | – ACK<br>– Ignore<br>– Not Implemented<br>– Extension (Note 2) | Optional |

Note 1: This Service Element may be the PUM User's Complete PISN Number or an Equivalent Alternative Identifier.
Note: 2: Implementor's Choice

FIG. 3 Contents of PUM-Update

The Following PUM Update Operation is Defined in Abstract Syntax Notation Number 1 (ASN.1) and Applies to the PUM Operations (i.e., PUMI and PUMO) Defined in the Standards. Note: The Encoding Reflects the Return Result as not Required.

--New Update Operation for ANF-PUM Call Handling Coding Requirements:--

```
PumUpdate::=    OPERATION
                --Sent from the Visitor PINX.
                ARGUMENT       UpdateArg
                RESULT         DummyRes
                ERRORS         {unspecified}
UpdateArg::=    SEQUENCE       {pumIdentity  PumIdentity,
                               --The PISM Number and/or an Alternative
                                   Identifier of the PUM User.
                               hostingAddr Party Number
                               --The PISN Number of the Hosting User
                               updateSvcOption  UpSvcOption,
                               --Can be new or Modify
                               updatedUserPin  UserPin}
                               --User Pin Value
UpSvcOption::=  ENUMERATED     {updateNewPin(0),
                               updateModifyPin (1)}
DummyRes::=     CHOICE         {null NULL,
                               ack  [1]IMPLICIT ack
                               ignore [2] IMPLICIT ignore
                               notimplemented [3] IMPLICIT notimplemented
                               sequOfExtn [4] IMPLICIT SEQUENCE OF
                                   Extension}
UserPin::=      OCTET STRING (SIZE(1..25))
pumUpdate       PumUpdate      ::= localValue 99
```

END -- of PUM Update Operations

FIG. 4   ASN.1 Coding of PUM-Update

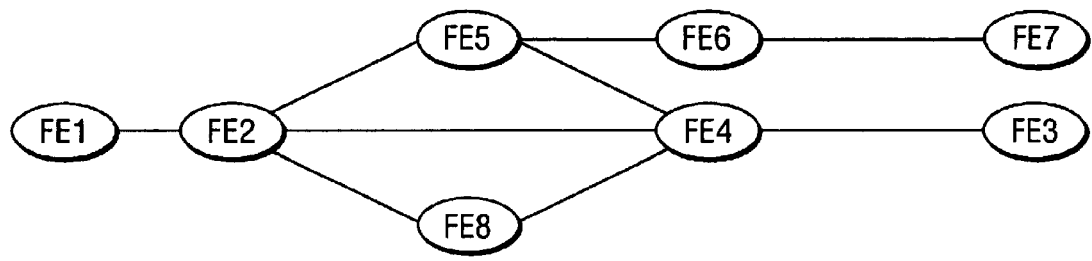
FIG. 5 ISO/ECMA Functional Model for PUM Supplementary Service

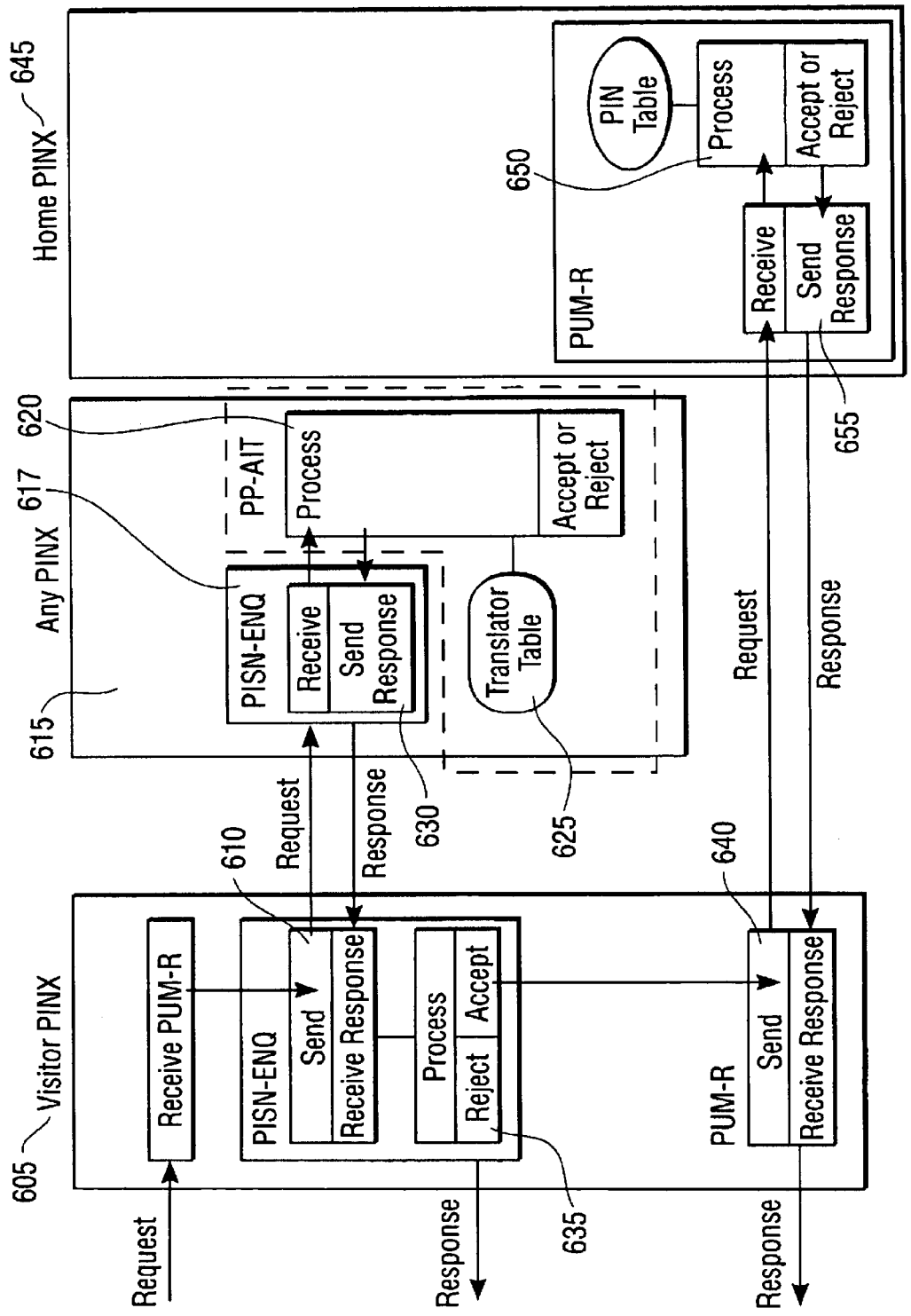
FIG. 6 PISN-ENQ Logic and Signalling
(PP-AIT Does Not Control Registration Signalling)

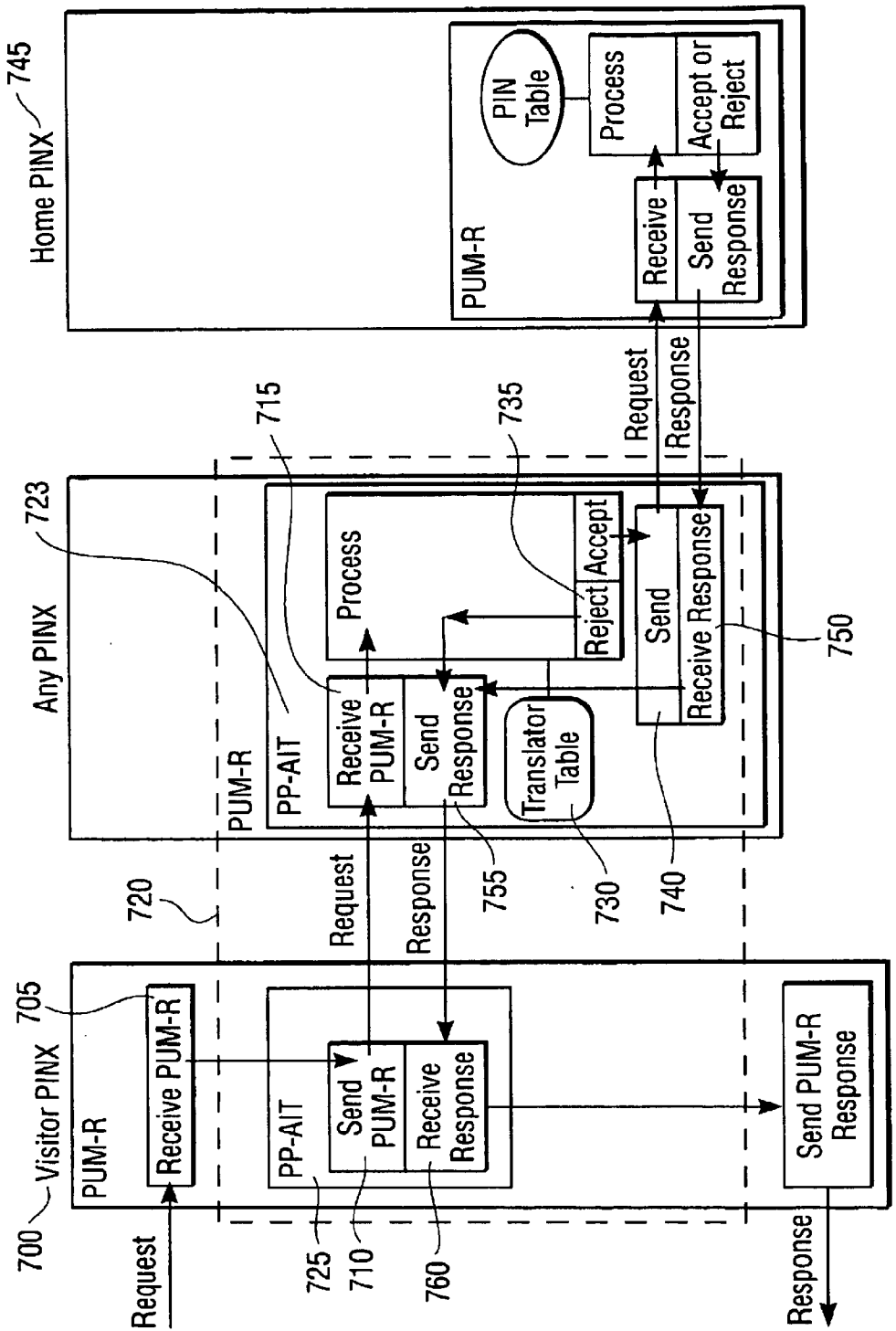
FIG. 7 PUM-R Logic and Signalling
(Control of Registration Signalling Between PP-AIT and Home PINX Transparent to Visitor PINX)

| AI Value [200] | Home PINX Address [205] | Time Schedule Index [210] | Description [215] |
|---|---|---|---|
| 10 | 100-1000 | 50 | PINX-US-students |
| 11 | 100-1000 | 51 | PINX-US-teachers |
| 12 | 100-1000 | 3 | PINX-US-admin. |
| 20 | 200-2000 | 1 | PINX-Japan |
| 30 | 300-3000 | 3 | PINX-UK-staff |
| 31 | 300-3333 | 50 | PINX-UK-students |
| 40 | Home | 60 | PINX-12-Juniors |
| 45 | Home | 61 | PINX-12-Seniors |

FIG. 8 Example Translator Table at PINX-12

| AI Value | Home PINX Address | Time Schedule Index | Description |
|---|---|---|---|
| 10 | 100-1000 | 50 | PINX-US-students |
| 11 | 100-1000 | 51 | PINX-US-teachers |
| 12 | 100-1000 | 3 | PINX-US-admin. |
| 20 | 200-2000 | 1 | PINX-Japan |
| 30 | Home | 3 | PINX-UK-staff |
| 31 | Home | 50 | PINX-UK-students |
| 40 | 400-4000 | 60 | PINX-12-Juniors |
| 45 | 400-4000 | 61 | PINX-12-Seniors |

FIG. 9 Example Translator Table at PINX-UK
(i.e., Multiple PP-AITs in Network)

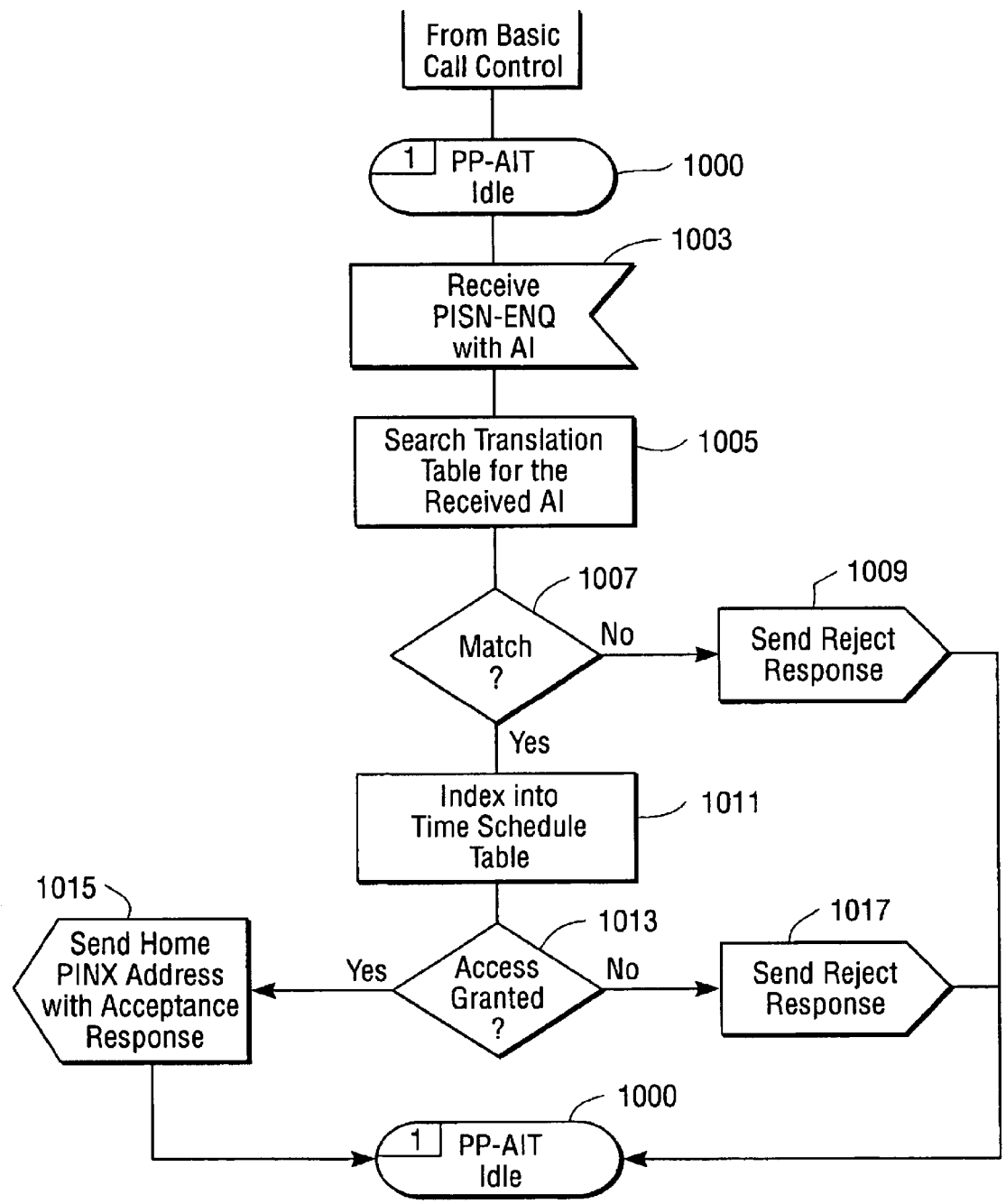
FIG. 10 PISN-ENQ to PP-AIT SDL

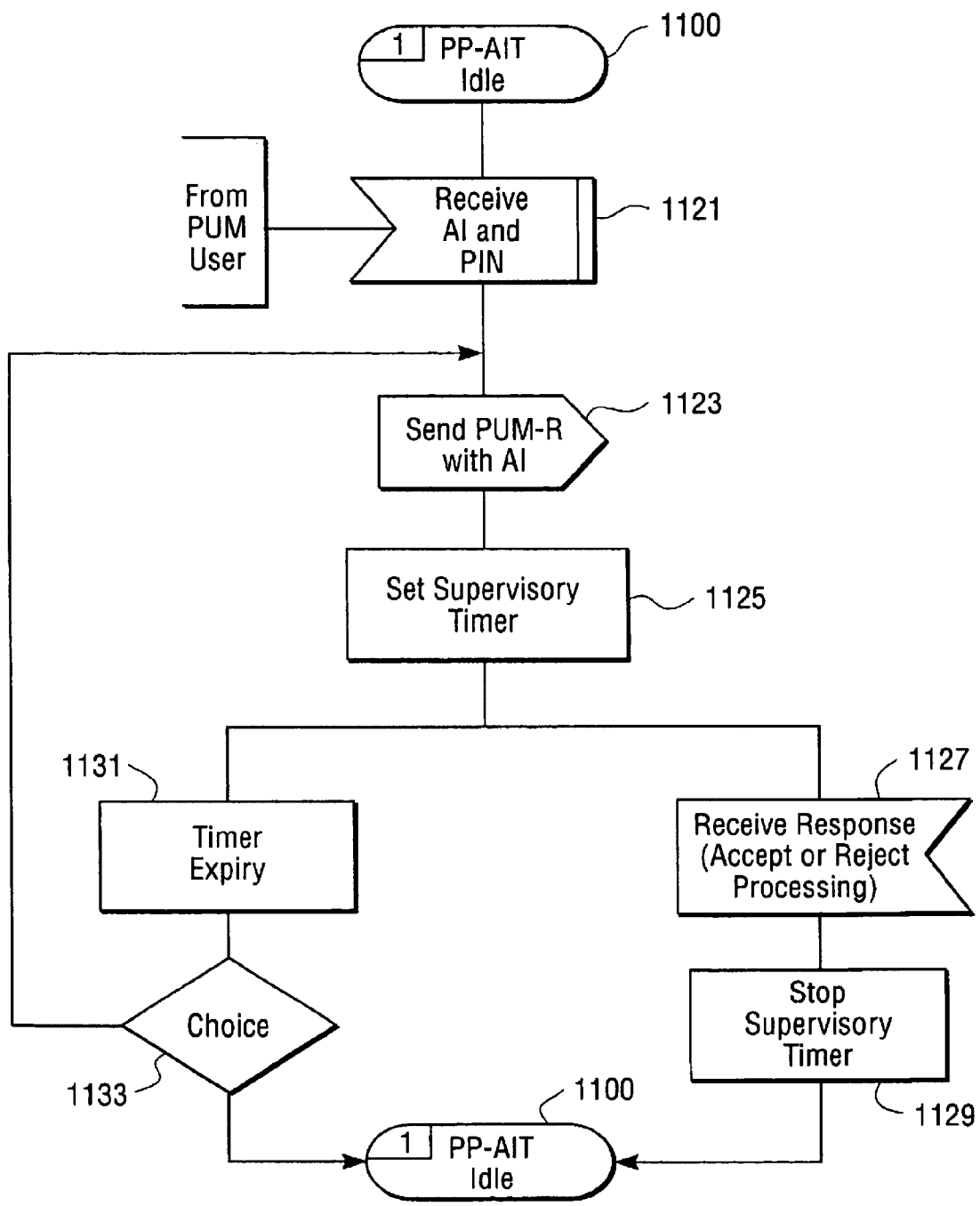
FIG. 11a  PUM-R to PP-AIT SDL - Visitor PINX

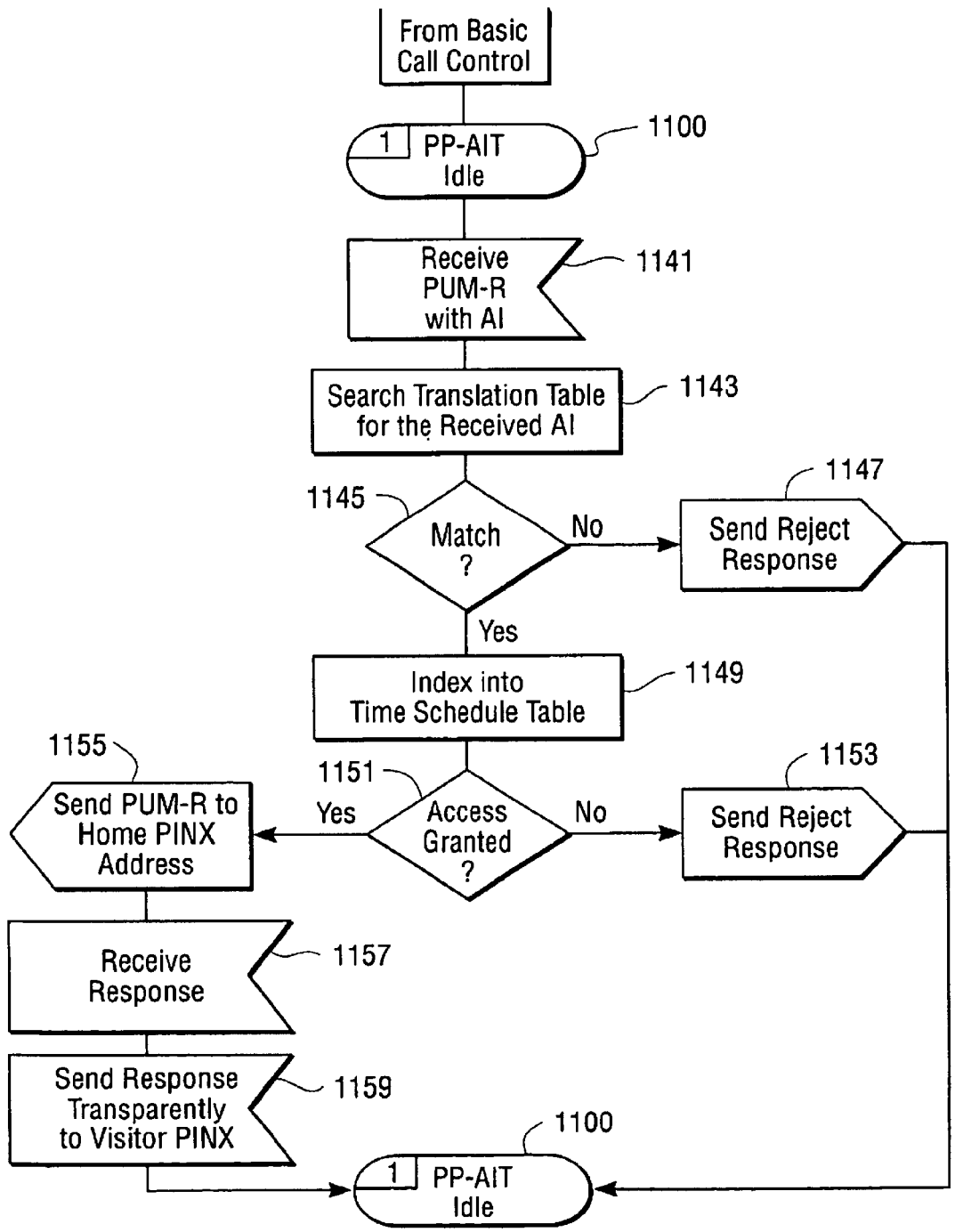
FIG. 11b PUM-R to PP-AIT SDL - Any/Directory PINX

PRIVATE USER MOBILITY (PUM) UPDATE AND PRIVATE INTEGRATED SERVICES NETWORK PUM ALTERNATIVE IDENTIFIER TRANSLATOR (PP-AIT) SYSTEM AND METHODS

STATEMENT OF RELATED APPLICATIONS

This application claims the benefit of PROVISIONAL APPLICATION SERIAL No. 60/136,375 filed May 26, 1999, which claims benefit of serial No. 60/110,666 filed Dec. 2, 1998.

TECHNICAL FIELD

The present invention relates to voice, multi-media, video and data services which span and interwork across an intelligent (e.g., ISDN, IN, Internet) network. The network can span the public network (e.g., CSIG at C reference point), private networks (e.g., QSIG at Q reference point), and interwork between public and private networks. This invention is applicable to ISO/ECMA QSIG compliant ISDN Private Integrated Services network (PISN) Inter-Exchange Signalling Protocol—Private User Mobility (PUM) Registration Supplementary Service and Call Handling Additional Network Features.

BACKGROUND OF THE INVENTION

Private User Mobility (PUM) functionality has been implemented previously by vendors in a single system/server where users may re-locate anywhere within the same system/server. Implementations may provide a means to change the PIN value during an active call within a single system/server, but not across a network.

The ISO/ECMA PISN PUM draft standards:
ISO/IEC 17875 PISN—Specification, functional model and information flows—Private user mobility (PUM)—Registration service (ECMA 281),
ISO/IEC 17876 PISN—Inter-exchange signalling protocol—Private User Mobility (PUM)—Registration supplementary service (ECMA 282),
ISO/IEC DIS 17877 PISN—Specification, Functional Model and Information Flows—Private user mobility (PUM)—Call handling additional network features (ECMA 283)
ISO/IEC DIS 17878 PISN—Inter-exchange signalling protocol—Private user mobility (PUM)—Call handling additional network features (ECMA 284)
provide network signalling for a mobile user, including registration, activation/deactivation, interrogation, and call handling (e.g., diverting an incoming call from the home PINX to the PINX where the PUM user is located). PIN is only included in the standards registration, deregistration and interrogation signalling. Update procedures and signalling mechanisms do not currently exist for changing the PIN during an active call. Thus, there is a need for such update and signalling mechanisms that do not exist in the draft standards as listed above.

Additionally, PUM has been implemented previously by vendors in a single system where users may re-locate anywhere within the same system. This system feature does not require a PUM number or AI since the visitor device and PUM user/HDM is still within the local system which performs PUM registration, de-registration, and other PUM-related services based on a user's PIN.

The ISO/ECMA PISN PUM draft standards, as noted above, provide an alternate means for network PUM registration where the user enters an alternative identifier rather than the PUM number. This adds an additional level of validation checking for registration. However, the mechanism to translate the alternative identifier to an address that can handle the particular user registration is not defined. Because the draft standard has not been approved as of this writing, no known vendor has implemented the alternative identifier translator. Thus, there is a need to provide a mechanism to translate the alternative identifier as discussed.

SUMMARY OF THE INVENTION

This invention describes update mechanisms comprised of signalling and a service elements to change a PIN value associated with an active call. It describes a procedure associated with the update mechanism which can be implemented as an additional procedure to the QSIG Private User Mobility (PUM) supplementary services. This invention is not limited to a QSIG private network, rather, it could apply to a QSIG at the public network reference point C (i.e., CSIG), TCP/IP, CSTA protocols, etc.

Specifically, in one embodiment, an update procedure:
uses existing PUM registration to validate/authenticate the new/modified PIN entered by a PUM user,
provides out-of-band/D-channel signalling for changing a PIN value during active call state,
update procedure with service elements including (but not limited to) change type and
the new PIN value, and
matching call detail recording by PIN value (optionally) at each PINX in the call path as a result of honoring the Update procedure. Optionally, the CDR update procedure may be ignored at other systems/servers that receive the PUM-Update invocation request.

Following call clearing, the PUM user's session at the Visited PINX may optionally revert back to the originally registered PIN value (stored), or, may continue the PUM user's session using the last entered PIN value, for example, based on an administrative parameter(s) or fixed as an implementor's choice.

In another aspect of the present invention, a mechanism ("PP-AIT"-PISN/PUM Alternative Identifier Translator) to translate the alternative identifier to an address that can handle the particular user registration is disclosed.

The PP-AIT includes a software translator mechanism with various implementation options, for mapping an alternative identifier to a translated number representing the Home PINX of the particular PUM user and returning either a rejected result or accepted result with the Home PINX address which is used for subsequent registration, de-registration and other processes (e.g., interrogation). PP-AIT optionally facilitates the registration process on behalf of the requesting PINX (i.e., Visitor PINX) effectively performing both first and second level security validations and returning either a rejected result or accepted result with the PUM number. This control of the signalling is beyond what the standards have identified but is significant since it circumvents the signalling of the Enquiry (i.e., PISN-ENQ) information flow but is still ISO/ECMA compliant signalling.

Specifically, PP-AIT has the following capability:
1. The Alternative Identifier can be translated to a network routable address that can register the particular PUM user and provide subsequent services such as redirecting this user's incoming calls to the visited remote location. This invention provides a detail description of the translation process to the appropriate network routable address for this PUM user. It also enhances the function whereby PUM registration permission is optionally based on day of year, time of day.

2. The standards bodies have allocated the translation mechanism to a Directory PINX only. This invention allows for the translation mechanism to be located anywhere in the network, in multiple PINXs and even outside the presence of a directory PINX.

3. As an implementation option, this invention provides an alternative way to circumvent and reduce the ISO/ECMA defined signalling (i.e., without changing the signalling, only eliminating potentially unnecessary signalling reducing overall network traffic on the D-channel), transparent to the network. The signalling is ISO/ECMA compliant and therefore compatible with any other ISO/ECMA compliant vendor's product.

4. Using an Alternative Identifier rather than the user's address/identity is more secure since it adds an additional level of security validation. ISO/ECMA indicates the AI length is up to 20 characters. This invention provides a means to reduce the AI digit length significantly without decreasing security, thereby making registration faster due to fewer digits needed for the user to enter.

5. ISO/ECMA QSIG PUM standards require the alternative identifier uniquely identify the PUM user. The US market requires 64,000–100,000 PUM users per PINX. US market networks range in size from 2 to hundreds of PINXs. This potential high number of unique AIs network-wide can result in high overhead processing of a very large translation table. In accordance with this invention, the alternative identifier value need not be unique which reduces the overall number of AIs that need to be assigned and managed and significantly increases processing time of the translation table.

These and other advantages of the present invention are disclosed in the detailed description of the invention and when read in conjunction with the following Figures.

BRIEF DESCRIPTION OF THE DRAWINGS

FIG. 1 is a block diagram of the PUM-Update major components/modules in accordance with the present invention.

FIG. 2 is a detailed block diagram of PUM-Update procedure and logic in accordance with the present invention.

FIG. 3 is the a table of the PUM-Update service element contents in accordance with the present invention.

FIG. 4 is an example of PUM-Update ASN.1 encoding.

FIG. 5 is the ISO/ECMA functional model comprised of the PUM functional entities; specifically, the present invention performs FE8 translator functions and can control registration signalling on behalf of Visitor PINX.

FIG. 6 is a detailed block diagram of PP-AIT with the translator function returning a Home PINX address in accordance with the present invention.

FIG. 7 is a detailed block diagram of PP-AIT with the translator function and the ability to control the registration signalling on behalf of Visitor PINX returning the PUM user's PUM number in accordance with the present invention.

FIG. 8 is an example Translator table depicting PP-AIT address resolution.

FIG. 9 is an example Translator table where multiple PP-AITs exist in the network.

FIG. 10 is a SDL description for the PP-AIT mechanism when a PISN-ENQ is received with an AI.

FIGS. 11a and 11b are SDL descriptions for PP-AIT at a Visitor PINZ where a user has entered a PIN and AI to be registered as a PUM user; and when a PUM-R is received with an AI and PIN respectively.

DETAILED DESCRIPTION OF THE INVENTION

Terminology used in this disclosure:

Active call: The term "active call" in this disclosure includes other states that can be reached following through-connection (i.e., beginning with sending the Connect message) such as consultation hold, park, conference, etc. Which specific states to allow PUM-Update is an implementor's choice.

Alternative Identifier: An alternate identifier (AI) may be entered by the user instead of entering a PUM number. The AI must be translated to an address that can register the particular user and perform services for the remote user. In accordance with this invention, the alternate identifier translation result represents the user's Home PINX address and need not be unique. The Home PINX address is used to complete registration and other services (e.g., redirect the PUM user's incoming calls to the visited PINX) provided by the Home PINX for its PUM users.

APDU: Application Protocol Data Unit

Call Detail Recording (CDR): An accounting feature of a system or network of systems which collects and records information about outgoing and incoming calls (e.g., internal and external, data, voice), for example, who made/received calls, time of day, duration, PIN, etc. The records are typically used for charge-back billing and other reporting.

Change PIN/CDR: Two types are identified: "new" and "modify".

Destination PINX: The PINX of the called user. A destination PINX may also be a Visitor PINX serving a called PUM user.

Directory PINX: PINX where ISO/ECMA has defined FE8 is located in the network.

FE: ISO/ECMA functional model comprised of Functional Entities (FEs 1through 8) which provide the services and signalling of PUM.

Gateway: An entry-point PINX or end-point PINX providing protocol conversion/interworking (e.g., between non-QSIG and QSIG, public network and private network).

Home Data Base (HDB): The database in which the data of a cordless terminal or a mobile user are stored (i.e., HDB resides at Home PINX).

Home PINX: The PINX that has local access to the HDB entry for a particular PUM user.

Modify PIN/CDR: This type of change indicates that the call detail recording record should overwrite the existing PIN value with the modified PIN value received.

New PIN/CDR: This type of change indicates that the call detail recording record should be closed and a new one opened with the new PIN value.

PP-AIT: The software mechanism described in the present invention which translates the Alternative Identifier value and returns the PUM user's Home PINX address. Optionally, it may complete the registration function (i.e., PUM-R) on behalf of the Visitor PINX and return the user's PUM number.

PINX: Private Integrated Services Network Exchange (ECMA 133); applies to the terms "system/server" as well.

PISN: Private Integrated Services Network (ECMA 133)

PIN: Personal Identification Number (unique string typically comprised of digits) assigned to the particular PUM user. A PUM user may have more than one PIN assigned depending on the particular application of PIN.

Private User mobility (PUM): The capability of a PINX user to register at any PINX terminal, and so receive certain PISN services at the visited terminal/PINX.

PISN-ENQ: Confirmed information flow used to request/ENQuiry the PUM number for a PUM user identified by an alternative identifier.

PUM Number: The particular user's unique address/identity used, for example, to route a registration request to the Home PINX for validation.

PUMI: Incoming PUM call.

PUMO: Outgoing PUM call.

PUMX: Refers to either a PUMO or PUMI.

PUM-R: Confirmed information flow that is used to request a PUM Registration upon a PUM user invoking registration at a visited terminal/PINX.

PUM user: A registered mobile user currently located at a Visitor PINX. Also, a particular mobile user with FE1 and FE2 user functions currently located at a Visitor PINX.

SDL: Specification and Description Language

Visitor Data Base (VDB): A PINX with FE4 functionality serving the PUM user. FE4 receives a PUM-R from FE2. FE4 communicates directly with FE8.

Visitor PINX: A PINX serving the PUM user invoking PUM functions (e.g., registration, PUM-Update). Also, a PINX with FE3 and FE4 functionality serving the PUM user invoking PUM functions (e.g., registration). FE2 receives a PUM-DR1 from FE1. FE2 communicates directly with FE4 and FE8.

The present invention relates to a system for enabling the PUM supplementary telecommunication service functions, in particular, an update procedure in a communication network having a plurality of interconnected PINXs which enables a mobile user to change the PIN value associated with a particular active call without disruption of the bearer channel. Preferably, there is no limit on the number of times a PUM user may change the PIN. Following call clearing, the PUM user's session at the Visited PINX may optionally revert back to the originally registered PIN value, or, may continue the PUM user's session using the last entered PIN value (implementor's choice).

The types of changed PIN (and CDR) include:

"new" PIN: This type of change indicates that the existing call detail recording record associated with this call should be closed, then, a new record immediately opened using the new PIN value.

"modify" the existing PIN: This type of change indicates that the existing call detail recording record associated with this call should merely overwrite the PIN value with the modified PIN value received.

Both the calling and called user may be PUM users. Likewise, when a call involves more than two PUM users (e.g., conference), all PUM users may invoke the PUM Update operation. Administrative parameters may be used at each system/server involved in the call path to determine whether it should honor or ignore the PUM update operation.

Each system/server in the network may be capable of CDR. Typically, when a system/server receives a PIN in a SETUP message, it is recorded in each CDR record (i.e., one record per call)—even at transit system/servers. A PUM user registers with a PUM number and/or alternative identifier and PIN. The PIN is delivered over the network during setup establishment (e.g., SETUP message) of an outgoing call. For incoming calls to a PUM user, the PIN is available at the visitor PINX (i.e., by prior registration), but not available at the system/server of the calling party. PUM-Update permits sending a PIN value into the network beginning with the Connect message to the calling party's PINX. When the PIN is sent over the network in the D-channel associated with a call, each system/server in the connection may record the PIN in its CDR. The CDR records generated for a private network are commonly collected from each system/server and sorted (i.e., including a sort field on PIN) so that all the CDR records for a particular call are together for accounting/charge-back to a person or account for billing reasons.

The application of multiple PINs associated with one call i.e., one PIN per segment of a call is not possible with the current ISO/ECMA standards. For example, where PIN is used as an account code (e.g., many PINs to many PUM users relationship, not one-to-one), PUM users may need to change the PIN multiple times during one call. For example, two attorneys discussing first, case A, then case B and lastly case C during one call. A PIN is entered initially during setup establishment (by an attorney) for the duration of case A discussions, then the PIN value is changed (by an attorney) at the beginning of discussions on case B, and the PIN value again changed (by an attorney) at the beginning of discussions on case C. Using the "new" PIN service option, the update of the PIN value is sent into the network over the D-channel. Each system/server in the call path may optionally act on the update information by closing the existing CDR record, then open a new record with the "new" PIN value. Subsequently, there will have been 3 CDR records (with PIN values for case A, case B and case C) recorded at each system/server (i.e., assuming they are acting on the update information) for this one call.

Using the above example, if the PUM user had instead chosen the "modify" PIN option each time a PIN was entered, only one CDR record would have been recorded at each system/server (i.e., assuming they are acting on the update information) using the PIN value of case C, the last PIN value entered by the PUM user.

It is feasible that the calling and called users (and other PUM users involved in a multi-party call) may be PUM users and can both change the PIN value during the call. This is one reason why each system/server in the call path may optionally act on the update information. Administrative parameters may be implemented to control what the system/servers should do in this case (e.g., destination system/servers records its PUM user's PIN values, originator system/servers records its PUM user's PIN, and transit system/servers record only originator PUM user's PIN values).

FIG. 1 illustrates a block diagram of the major components and signalling involved in the PUM-Update mechanism in accordance with this invention. The diagram represents a call example where a PUM user makes an outgoing call from the Visitor PINX (1) and is routed via Transit PINX (3) to its destination in Any PINX (5). Two ISO/ECMA operations PUMO (7) and PUMI (8) exist for PUM call handling. During connect state, when a PUM user (this example shows where the PUM user made an outgoing call) invokes either a "new" PIN or "modify" PIN and the PIN value, PUM-Update (9) is activated. The Change Pin process (15) detects whether a "new" or "modify" request was entered by the user (e.g., via key depression) and stores the request along with the subsequent PIN value entered by the PUM user. The PIN value must be validated and/or registered. This is accomplished via calling the PUM-R and/or PISN-ENQ processes (17) which sends a confirmed request on a call-independent connection.

A response of acceptance or rejection is returned. If the PIN value was accepted, PUM-Update will send (19) a PUM-Update invocation (21) in a NOTIFY or FACility message on the D-channel of the active connection. This request may be sent (i.e., pumo) indicating a return result, shown as (22), is requested or it may be sent without confirmation (i.e., implementor's choice). PUM-Update operation functions identically from the destination PINX on an incoming connection (i.e., pumi).

Still referring to FIG. 1, likewise, when a transit or destination PINX tandem receives a facility request for PUM-Update, PUM-Update (11 and 13) components are activated. The PUM-Update request is acted on according to the PINXs administrative parameter(s). At a transit PINX, where no PUM user exists, the PUM-Update modules for Change PIN and Call PUM-R or PISN-ENQ functions are not needed. The inset (13) illustrates the transit PINX PUM-Update module comprised of receiving a Pumx-Update invocation (12 and 14) from either or both directions receive paths, optionally acting on "new" or "modify" actions pertaining to CDR based on administrable parameter (s). Then, tandeming the messages transparently on the outgoing send paths (12a and 14a). Responding to a pumoUpdate.inv is not applicable at a transit PINX. A transit PINX merely tandems any return results as shown by the pumoUpdate.res (12b and 12c) received from the destination PINX (a pumiUpdate.res is not shown). It will be appreciated that Transit PINX connections shown as cross-over in FIG. 1 has no significance and is for illustration purposes only.

Still referring to FIG. 1, the destination PINX (or alternatively, an outgoing gateway PINX) receives the pumoUpdate.inv (21) and shall act on it based on its administrative parameter(s). If the request indicates to return a result, it shall honor the request and send the applicable result (23). This response is sent back to the requester. The Visitor PINX upon receiving the return result (e.g., reject) may act accordingly (e.g., mark the CDR record with an imprecise data flag indicating CDR records may not match across the network).

FIG. 2 represents the Specification and Description Language (SDL) for the PUM-Update procedure for both the Visitor PINX and the destination PINX either of which may have a PUM user connected with the active call (30), that is, an active call state reached via a Connect message. PUM-Update is idle (33) until either a PUM user enters a change PIN/CDR invocation with a PIN value (35), or, when a Connect, Facility or Notify message with PUM-Update invocation is received (51).

Upon receiving a "new" or "modify" CDR request from the PUM user, the PIN value should be validated even when the PUM user has already registered with a different PIN. As one alternative choice, some high priority PUM users may have reserved PIN values that exempt it from such validation. A PUM user may use more than one PIN value depending on the application. A Facility message with a PUM-R req.ind (and/or PISN-ENQ when the PUM user has an alternative identifier) is sent to the PUM user's Home PINX in order for the PIN value to be validated. A return response (41) indicates whether or not the PIN value has been validated. If a rejection (unacceptable) is received, an error indication (e.g., display) is sent to the user (43). Otherwise, upon acceptance, a pumxUpdate.inv (45) is sent to the other end of the connection. It may be sent in a Facility message when a return result is requested, or, in a Notify message when no return result is required. The Visitor PINX shall interface with CDR (48) by sending an internal message (or other implementation) in order to act on the change request, either:

"new" CDR which indicates to close the current CDR record, then open a new CDR record using the new PIN value or "modify" CDR which indicates to overwrite the current PIN value with a modified PIN value.

If a return result was sent in a Facility message, then the Visitor PINX shall wait for the response. If no response is received before time-out, the message may be resent (i.e. implementor's choice). If the return result was negative (e.g., not implemented), the Visitor PINX may elect to denote in the CDR record that network records may be imprecise. The PUM-update procedure returns to idle, but, may be reactivated at any time during the call duration.

Still referring to FIG. 2, when a PINX receives a pumx-Update.inv (51), it shall determine whether to act on it according to its local administrative parameter (55). If yes, then indicate the action (i.e., "new" or "modify" CDR) to the CDR procedure (57). If no, go to step (61). If the PINX is an end-point (i.e., Visitor or Any PINX that is not a transit) and a return result was requested, a Facility message with the appropriate result shall be returned to the sender (61).

FIG. 3 shows one embodiment of the contents of the PUM-Update invocation (pumxUpdate.inv). The PUM user's Identity (65) is used to identify the PUM user. It is a mandatory service element. The Hosting Address (67) is the Visitor PINX network address and is a mandatory service element. Service option (69) has two possible values: 1) "new" PIN/CDR indicates to the receiving PINX(s) that the current CDR record shall be closed and a new CDR record opened using the new PIN value, 2) "modify" PIN/CDR indicates that the current CDR record shall overwrite the existing PIN value with the modified PIN value. The new/modified PIN value is sent in service element (71) and is mandatory. A PIN value of zero may be considered valid (i.e., implementor's choice) and could have special meaning of "no PIN". In this case, for example, the PIN may or may not be validated (e.g., PUM user with designated priority to use no/zero PIN without validation). Request result (73) indicates to the end-point receiving PINX that it must return a result indication (i.e., ACK, Invalid/error, Not implemented) in a Facility message. This service element is optional, but a response will not be sent if not requested.

FIG. 4 provides one embodiment of the ASN.1 for the PUM-Update operation. This code effectively extends the ISO/ECMA ASN.1 PUM operations to include the PUM-Update operation and is therefore, not stand-alone code. It has just been shown a mechanism for updating a PUM users PIN at various points in a network. The present invention contemplates all obvious variations to the particular embodiments disclosed herein.

PP-AIT

Now a mechanism for translating the alternative identifier to an address that can handle the particular user registration is disclosed. This mechanism also relates to a system for enabling the PUM supplementary telecommunication service functions, in particular, the translation of a PISN PUM alternative identifier supplementary service in a communication network having a plurality of interconnected PINXs which enables mobile users to temporarily relocate to a remote/visitor PINX in the network.

PP-AIT signalling request/confirmation support include 1)PISN-ENQ receive and send response component (i.e., request translation of AI), translation and returning a result and 2a) PUM-R send request/receive response component and 2b) PUM-R receive request/send response component (i.e., PUM-R request registration only when PUM user's identity service element=alternative identifier), translation, completion of registration signalling and returning a result. PP-AIT does not act on:

- a PUM-R request with PUM user's identity service element=PUM number or
- other PUM requests/confirmation e.g., PUM-DR1 and PUM-11, with PUM user's identity service element= PUM number or alternative identifier.

FIG. 5 illustrates the ISO/ECMA functional model in an interconnected private network system. The following ISO/ECMA functional entities (FE) are provided as informational only:

FE1: Service initiating control entity
FE2: Service control entity
FE3: PUM user's local service agent entity
FE4: VDB function control entity
FE5: HDB function control entity
FE6: Old VDB function control entity
FE7: PUM user's old local service agent entity
FE8: Identification mapping entity To relate the present invention to the functional entities described in the ISO/ECMA functional model (FIG. 5), four entities are primarily used:

a PUM user, (i.e., FE1 and FE2)
a Visitor PINX serving the PUM user and VDB (i.e., FE3 and FE4),
PP-AIT which may reside in any PINX(s) in the network (i.e., FE8 plus additional functionality), and
a Home PINX serving the PUM user's static residence and HDB (i.e., FE5).

PP-AIT can be centralized or distributed in the network i.e., at a single PINX in the network (e.g., ISO/ECMA specify FE8 located at a single directory PINX in the network), or at selected PINXs in the network (e.g., network hub PINXs), or at all PINXs in the network (in this case PISN-ENQ signalling is purely an internal interface).

Two signalling options are supported by PP-AIT and are described in FIG. 6 (using PISN-ENQ) and FIG. 7 (using PUM-R). One or both options may co-exist in PP-AIT since both are mutually exclusive. The implementation option selected may conserve on network resources and D-channel traffic depending on the particular network topology and configuration. Both PISN-ENQ and PUM-R signalling are call independent signalling connections, therefore, bearer channel connections through the network are not impacted.

Both diagrams in FIGS. 6 and 7 include functions found in the Visitor PINX, PP-AIT (at any PINX) and the Home PINX. The focus is on the functions of PP-AIT in accordance with the present invention. PP-AIT functionality could be located in the PINX of both or either Visitor PINX and Home PINX or could be in a separate PINX. This is true for both signalling options.

When the Visitor PINX receives an alternative identifier (e.g., PumRegistrArg {alternativeId}) entered from a PUM user, the Visitor PINX must know the address where PP-AIT resides (i.e., same PINX or another PINX) which is typically administered in its local database. Likewise, any FE2 and FE4 in the network must know the address of PP-AIT in order to send a PISN-ENQ to obtain the translated number.

PISN-ENQ: Enquiry Logic and Signalling

In FIG. 6, the Visitor PINX [605] sends a PISN-ENQ request [610] to PP-AIT [615] with a PISN-ENQ receive/send response component [617], (PP-AIT functions are located in the dashed box) which provides only the translation function and if translation is successful, returns accepted and a Home PINX address to the Visitor PINX, otherwise a rejection is sent. This is the first level security pass adherent in a network employing alternative identifiers. This translator functionality and signalling is compliant with the ISO/ECMA standards.

PP-AIT, upon receiving a PISN-ENQ request, shall process [620] the request by looking up the received alternative identifier value in its local Translator Table [625]. An example Translator table is provided in FIG. 10. If the AI value is not found, PP-AIT returns a response result [630] of "rejected" to the Visitor PINX (and subsequently FE1). If the AI value is found, the corresponding Home PINX address assigned to the AI is returned in the response service element "PUM number" and an "accepted" result is indicated. This completes PP-AITs translation function for a PISN-ENQ. The Visitor PINX indicates to its PUM user that registration failed [635] if the returned result is rejected.

If the returned result is accepted, the Visitor PINX then sends a PUM-R request [640] to the Home PINX [645] which validates [650] the PIN received in the PUM-R (second security level) and returns [655] either registration acceptance with the user's PUM number, or, registration rejection to the Visitor PINX.

A PISN-ENQ may be sent (from either FE2 or FE4) to PP-AIT for other services such as deregistration and interrogation and PP-AIT honors the request and returns a result. However, after successful registration, the PUM user's number is known and can be saved and used for other services rather than translating the alternative identifier again.

PUM-R: Registration Logic and Signalling

Referring to FIG. 7, the Visitor PINX [700] receives a PUM-R request [705] with AI and gives control to its PP-AIT PUM-R send component [710] (special PP-AIT processing in the Visitor PINX) which tandems the PUM-R request with AI (in accordance with the present invention) to the PP-AIT PUMR receive component [715]. Tandeming the PUM-R replaces sending a PISN-ENQ to PP-AIT and Visitor PINX [725] subsequent registration processing. This mechanism is not included in the ISO/ECMA standard although the signalling is entirely compatible with the draft standards. PP-AIT (as shown within the dashed box [720]) includes both components PUM-R send/receive response [725] and PUM-R receive/send response [723]. The diagram depicts the PP-AIT send PUM-R/receive response component [725] in a separate PfNX from the PP-AIT receive PUM-R/send response component [723] although both could reside in the same PINX.

Still referring to FIG. 7, PP-AIT, upon receiving a PUM-R request [715] with AI, shall process the message similar to a PISN-ENQ by first looking up the received alternative identifier value in its local Translator Table [730]. If the AI value is not found or access denied, PP-AIT returns a response result of "rejected" [735] and Cause of rejection= (for example) "PUM user's identity not known" to the Visitor PINX and this ends this user's registration process. This is the first level security adherent in a network employing alternative identifiers. If the AI value is found, PP-AIT shall facilitate the completion of the registration process on behalf of the Visitor PINX. PP-AIT sends the received PUM-R message [740] to the Home PINX [745]. The PUM-R does not include a result or PUM number (sent as received) service elements in the direction to the Home PINX. PP-AIT shall adhere to ISO/ECMA timers, exception handling, etc. associated with sending a PUM-R request. Upon receiving a response [750], it is tandemed back to Visitor PINX [755] without any changes. PP-AIT receive response [760] also tandems the PUM-R response back to the requesting FE. PP-AIT [750, 725]need not interpret the response message. PP-AIT, with this signalling option, effectively brokers or acts as an agent for the Visitor PINX possibly saving time and network resources. PP-AIT can therefore be a transparent process in the network while eliminating the PISN-ENQ signalling.

AI Assignment, Management and Translator Tables

Referring to FIG. 8, the example Translator table requires 2 columns i.e., AI value [800] and Home PINX address [805] and may optionally have other fields. For example, an additional field to store an index [810] to a time schedule table (e.g., julian date 000–365 by 00:01 to 24:00 hour ranges) indicating when the Home PINX allows or disallows access for a user with this AI value. In this case, PP-AIT shall accept or reject the PISN-ENQ or PUM-R based on the time of day/day of year as compared with the indexed time schedule table. Another example field could be a description [815] of the particular AI and Home PINX (e.g., user's with AI=10 are students which are allowed access between 9 AM and 3 PM, user's with AI=11 are administrative staff which are allowed access between 8 AM and 5 PM). The description field is not used by PP-AIT, it is only a comment field for the network administrator. It is recommended that the table be kept in sorted order by AI value and that binary searches are used to match the received AI value to an AI value in the Translator table. The Home PINX address assigned to an AI may be a one (AI) to one (Home PINX) relationship (e.g., AI=20 to 200–2000) or a many (AIs) to one (Home PINX) relationship (e.g., AI=40 and 41 to "home"). More than one Home PINX address may be assigned to the same Home PINX. This may be desired so as to add a level of security to the access of a PINX (e.g., via a time schedule). A PP-AIT requirement is that the Home PINX address assigned to an AI value in the Translator table be a routable address in the network to the PUM user's Home PINX.

AI values need to be pre-defined and assigned to PUM users. An AI value may be assigned to one or many PUM users i.e., it need not be unique to one user in accordance with the present invention, in fact it is recommended there be a limited number of AI values per Home PINX in order to decrease processing time. All PUM user's having the same AI value (unknowingly) must be residents of the same home PINX.

The ISO/ECMA standard has defined the AI as an octet string of 1–20 bytes. It is recommended in accordance with the present invention that AI values have a short length to limit the number of digits dialed by the PUM user during registration. It is required that each PINX have one or more unique AIs. For example, in a network of 75 or fewer PINXs (leaving room for growth) where only one AI value addresses one PINX, an AI length of 2 digits is sufficient (i.e., values 0–99). Another example, in a network of 25 PINXs where each Home PINX supports 4 different AI values, a 2-digit AI length leaves no room for future growth since all 100 values would be assigned. In this case, a maximum AI length of 3-digits is needed (unless the particular network is expected to decrease in PINXs).

Still referring to FIG. 8, the example illustrates AI values 10, 11, and 12 that route to the same Home PINX (i.e., PINX-US) using the same address 100–1000. AI value 20 routes to one Home PINX (i.e., PINX-Japan). AI values 30 and 31 both route to the same Home PINX (i.e., PINX-UK) but using two different Home PINX addresses. AI value 40 and 45 are mapped to a Home PINX of "home". This indicates that PP-AIT is located either in the same PINX as the invoking PUM user or the Home PINX for this PUM user is the PINX with PP-AIT. In the first case, network registration is purely a local process. In the second case, as an implementor's choice, PP-AIT could return either the PUM user's number or the Home PINX address in a PUM-R or PISN-ENQ.

Still referring to FIG. 8, a field is designated for a time schedule index [810]. When PP-AIT finds a matching AI value in the Translator table as was received in a PISN-ENQ or PUM-R, it shall use the index into a time schedule table (not depicted) which indicates, for example, the day of year/time of day access permission (i.e., access allowed or disallowed). PP-AIT shall compare the internal clock time and date to the index access permission data and if access is disallowed, return result rejection and if applicable, with cause=e.g., "PUM user not permitted to register". Otherwise, if access is permitted for this day/time, the return result is "accepted".

FIG. 9 is an example of a Translator table in another PINX (i.e., PINX-UK) when multiple PPAITs are configured in the network (where FIG. 8 is in the same network as FIG. 9). The Home PINX address is "home" for both AI values 30 and 31 and AI value 40 and 45 have the PINX-12 address (i.e., 400–4000). This reflects the different PINX frame of reference as it regards to the Translator table Home PINX addresses.

FIG. 10 illustrates a Specification Description Language (SDL) for PP-AIT [1000] when a PISN-ENQ is received with an AI [1003]. PP-AIT shall use the AI to search its translation table [1005] for an identical matching entry [1007]. If no matching AI value is found, a return result of rejection shall be sent [1009] to the Visitor PINX. If a matching AI value was found, the associated index (when employed) is used to lookup in the Time Schedule table [1011] and compare the current system day and time to the Time Schedule table entry for the allowed access days and time. If the current time falls within the permissible access time(s) [1013], a return result with acceptance and the Home PINX address is sent in the response [1015]. Otherwise, if the current time did not fall within the permissible access time(s), a return result of rejection is sent in the response [1017]. PP-AIT returns to idle state [1000].

FIGS. 11a (at the Visitor PINX) and 7b (Directory/Any PINX) provides the detail the logic of the PP-AIT PUM-R functions and signalling. This signalling option does not require a separate PISN-ENQ message sequence to translate the AI.

FIG. 11a illustrates a Specification Description Language (SDL) for PP-AIT [1100] at a Visitor PINX where a user has entered a PIN and AI to be registered as a PUM user. An internal message is sent to PP-AIT which receives it [1121] and shall process it by sending the AI and PIN in a PUM-R [1123] to a Directory PINX (i.e., can reside in any PINX) in a non-call related Setup message. A supervisory timer is set [1125] to monitor for a response. The supervisory timer for receiving the PUM-R return result response should allow enough time for network signalling and functions of PISN-ENQ (although a PISN-ENQ is not used) and PUM-R that will be performed by the Directory PINX. When a return result response is received [1127], the supervisory timer is stopped [1129]. If the return result was acceptance, the PUM user is successfully registered and may continue with the call and PP-AIT is returned to idle state. Otherwise, if the return result was rejection, an indication of failure is returned to the user (e.g., "invalid PIN" display). If, however, the timer expires [1131] before receiving a response, it is an implementor's choice [1133] whether to resend the PUM-R (e.g., retry one time) or to treat the registration as a failure and indicate this to the user and return PP-AIT to idle state.

FIG. 11b illustrates a Specification Description Language (SDL) for PP-AIT [1100] when a PUM-R is received with an AI [1141] and PIN. PP-AIT shall use the AI to search its translation table [1143] for an identical matching entry [1145]. If no matching AI value is found, a return result of rejection shall be sent [1147] to the Visitor PINX and PP-AIT returns to idle state. When a matching AI value is found, the associated index (when employed) is used to lookup in the Time Schedule table [1149] and compare the current system day and time to the Time Schedule table entry for the allowed access days and time. If the current time did not fall within the permissible access time(s), a return result of rejection is sent in the response [1153] and PP-AIT returns to idle state [1100]. Otherwise, if the current time falls within the permissible access time(s) [1151], PP-AIT shall send the PUM-R (as received) on behalf of the Visitor PINX, to the Home PINX address (obtained from the Translation table). A PUM-R supervisory timer is started (refer to FIG. 11a for choices if this timer expires before receiving a response). The Home PINX performs the validation check of the PIN and, if valid, registration is successful and returns the PUM User's number (and other pertinent information) with acceptance in a return result response. The Home PINX functions are not illustrated in the SDL since they are not a function of PP-AIT and the signalling is compliant with the standards. When PP-AIT receives the response from the Host PINX [1157], it is transparently returned to the Visitor PINX [1159] and PP-AIT returns to idle state.

What is claimed is:

1. In a QSIG compliant ISDN network including a plurality of servers and comprising call handling services for at least one mobile user, said services being requested by said mobile user for an active call and wherein each said mobile user registers for said services with a personal identification number, a method for switching said personal identification number to another personal identification number from a set of previously known personal identification numbers during an active call, the steps of said method comprising:

registering the mobile user initially with said network for a service with said personal identification number during said active call;

signaling a user preference to switch said personal identification number to a new personal identification number; wherein said new personal identification number is a member of said set of previously known personal identification numbers; and switching said personal identification number to said new personal identification number during said active call.

2. The method as recited in claim 1 wherein the step of signaling further comprises: signaling a user preference to switch said personal identification number out-of-band.

3. The method as recited in claim 1 wherein said step of switching said personal identification number may be repeated more than once during said active call.

4. The method as recited in claim 1 further comprises the step of maintaining a call detail record for services requested by said user during said active call.

5. The method as recited in claim 4 wherein the step of maintaining a call detail record further comprises: recording services requested by said user according to said personal identification number.

6. The method as recited in claim 5 wherein the step of recording service according to said personal identification number further comprises: updating said call detail record with said new personal identification number when user switches said personal identification number.

7. The method as recited in claim 6 wherein the step of updating said call detail record further comprises: closing an existing call detail record associated with said active call and said personal identification number; and opening a new call detail record with said new personal identification number.

8. The method as recited in claim 6 wherein the step of updating said call detail record further comprises:

modifying current said personal identification number associated with current said call detail record.

9. The method as recited in claim 1 wherein a calling user and a called user are said at least one mobile user of said network and the step of switching said personal identification number may be accomplished by both said calling and said called users during said active call.

10. The method as recited in claim 1 wherein said plurality of servers are connected to deliver call services to said mobile users in a call path and wherein further each said server within said call path optionally may process said mobile user signal to switch said personal identification number.

11. The method as recited in claim 6 wherein said step of updating said call detail record further comprises: validating the switched personal identification number prior to updating said call detail record.

12. The method as recited in claim 11 wherein said step of validating the switched personal identification number is not applied for users having a reserved personal identification number.

13. In a QSIG compliant ISDN network comprising a plurality of servers connecting at least one mobile user requesting call services, wherein said mobile user registers with one of said servers with a private user mobility wherein further each said private user has an associated home server and may request services at said home server or other visitor servers; a method for a private user registration, the steps of said method comprising:

entering a user's alternative identifier instead of said private user mobility number at a server;

mapping said user's alternative identifier to a number representing said user's home server; and returning either a rejected or accepted result with said home server; wherein said step of entering further comprises sending a private user mobility registration request with said user's alternative identifier;

signaling control of registration request routed to said home server;

receiving a return response from said home server; and transmitting a response back to said server with said private user mobility number.

14. The method as recited in claim 13 wherein said step of entering further comprises sending a user-specific inquiry for registration with said user's alternative identifier.

15. The method as recited in claim 13 wherein said step of mapping may be distributed on any server within said network.

16. The method as recited in claim 13 wherein said step of mapping further comprises look up in a database that associates the user's alternative identifier to a home server address associated with the private user mobility number.

17. The method as recited in claim 16 wherein said database comprises a time schedule index used to process registration requests based on predetermined time parameters.

* * * * *